(12) United States Patent
Nair et al.

(10) Patent No.: US 12,534,281 B2
(45) Date of Patent: Jan. 27, 2026

(54) PUSH THROUGH BLISTER PACKAGE WITH UV LASER PRODUCED ENGRAVING OR ETCHING AND METHODS OF MAKING THEREOF

(71) Applicant: LIVEO RESEARCH AG, Basal (CH)

(72) Inventors: Ajith Sashidharan Nair, Downingtown, PA (US); Eric Charles Shockey, Middletown, DE (US); Andreas Josef Pfefferle, Ehrenkirchen (DE); Carsten Heldmann, Peine (DE)

(73) Assignee: Liveo Research AG, Basel (CH)

( * ) Notice: Subject to any disclaimer, the term of this patent is extended or adjusted under 35 U.S.C. 154(b) by 60 days.

(21) Appl. No.: 18/521,829

(22) Filed: Nov. 28, 2023

(65) Prior Publication Data

US 2024/0190634 A1    Jun. 13, 2024

Related U.S. Application Data

(60) Provisional application No. 63/429,487, filed on Dec. 1, 2022.

(51) Int. Cl.
*B65D 75/36*      (2006.01)

(52) U.S. Cl.
CPC ...... *B65D 75/367* (2013.01); *B65D 2575/361* (2013.01)

(58) Field of Classification Search
CPC ............ B65D 75/367; B65D 2575/361; B65D 75/327; B65D 2575/3227
See application file for complete search history.

(56) References Cited

U.S. PATENT DOCUMENTS

| | | | | |
|---|---|---|---|---|
| 5,360,116 A | * | 11/1994 | Schmiletzky | ........ B65D 75/326 206/532 |
| 5,522,506 A | * | 6/1996 | Roulin | ................. B65D 75/327 206/532 |
| 6,244,442 B1 | | 6/2001 | Inoue et al. | |

(Continued)

FOREIGN PATENT DOCUMENTS

| | | |
|---|---|---|
| EP | 2905079 | 8/2015 |
| JP | H07257640 | 10/1995 |

(Continued)

OTHER PUBLICATIONS

EVLaser, "Why are UV lasers used: applications, characteristics and types," 4 pages (2022) found online: <https://web.archive.org/web/20220528104320/https://www.evlaser.com/academy/why-are-uv-lasers-used-applications-characteristics-and-types/>.

(Continued)

*Primary Examiner* — Chun Hoi Cheung
(74) *Attorney, Agent, or Firm* — Fox Rothschild LLP

(57) ABSTRACT

Provided are a blister package and a method of making thereof. The blister package includes a rupturable substrate; and a blister layer overlayed by the substrate, thereby making a cavity between the rupturable substate and the blister layer. The rupturable substrate at least partially forms an engraving or etching that reduces push through force required for dispensing a product stored inside the cavity for customer dispensing. The rupturable substate and the blister layer are made of the same or same class plastic or polymer thereby making the blister package recyclable.

20 Claims, 15 Drawing Sheets

(56) References Cited

U.S. PATENT DOCUMENTS

| | | | |
|---|---|---|---|
| 7,758,936 B2 * | 7/2010 | Spallek | B32B 27/304 |
| | | | 428/34.1 |
| 8,079,475 B2 * | 12/2011 | McArthur | B65D 75/327 |
| | | | 206/532 |
| 9,079,698 B2 | 7/2015 | Safarik | |
| 9,468,584 B2 | 10/2016 | Riis et al. | |
| 9,988,194 B2 | 6/2018 | Brandl | |
| 10,633,160 B2 | 4/2020 | Wessely | |
| 10,865,026 B2 | 12/2020 | Wessely | |
| 11,059,643 B2 | 7/2021 | Wessely | |
| 2003/0051440 A1 | 3/2003 | Chow et al. | |
| 2008/0073240 A1 | 3/2008 | Bowers et al. | |
| 2008/0135441 A1 | 6/2008 | Meliniotis et al. | |
| 2008/0230432 A1 * | 9/2008 | Bobbett | B65D 75/327 |
| | | | 206/459.5 |
| 2009/0314664 A1 | 12/2009 | Henke et al. | |
| 2010/0243508 A1 | 9/2010 | Sekiguchi et al. | |
| 2011/0132794 A1 | 6/2011 | Ingraham | |
| 2011/0262589 A1 * | 10/2011 | Safarik | B32B 3/266 |
| | | | 426/119 |
| 2011/0266189 A1 | 11/2011 | Tom et al. | |
| 2013/0008825 A1 * | 1/2013 | McArthur | B65B 61/18 |
| | | | 53/462 |
| 2018/0118437 A1 | 5/2018 | Ghiam | |
| 2018/0153769 A1 * | 6/2018 | Dey | B65D 75/327 |
| 2019/0263549 A1 | 8/2019 | Van Landeghem et al. | |
| 2023/0312208 A1 * | 10/2023 | Gmeindner | B65D 75/327 |
| | | | 206/531 |

FOREIGN PATENT DOCUMENTS

| | | |
|---|---|---|
| JP | H11227851 | 8/1999 |
| JP | 3853391 | 12/2006 |
| JP | 5330642 | 10/2013 |
| JP | 3215693 | 4/2018 |
| JP | 2018076092 | 5/2018 |
| JP | 2020111385 | 7/2020 |
| JP | 2021169332 | 10/2021 |
| WO | 2014129623 | 8/2014 |
| WO | 2020148260 | 7/2020 |

OTHER PUBLICATIONS

Sookne, "Stream #1 Recyclable Pharma Blister: New Blister, Same Machines," 10 pages, (2021) found online: <https://www.healthcarepackaging.com/machinery-materials/package-design/article/21627034/new-pet-blister-package-is-fully-recyclable-in-ric-1>.

International Search Report and Written Opinion for International PCT Patent Application No. PCT/US23/81411 mailed Apr. 18, 2024 (15 pages).

* cited by examiner

| | |
|---|---|
| A | PolyPropylene Film with 500 msec exposure- Circular pattern |
| B | PolyPropylene Film with 750 msec exposure- Circular pattern |
| C | PolyPropylene Film with 60% strength exposure- Circular pattern |
| D | PolyPropylene Film with 70% strength exposure- Circular pattern |
| E | PolyPropylene Film with 80% strength exposure- Circular pattern |
| F | PolyPropylene Film with 90% strength exposure- Circular pattern |
| G | PolyPropylene Film with 100% strength exposure- Circular pattern |
| H | PolyPropylene Film with 50% strength exposure- Circular pattern |
| I | PET Film with 20 W exposure -Smaller circular pattern |
| J | PET Film with 20 W exposure -circular pattern |
| K | PET Film with 50% exposure - circular pattern |
| L | PET Film with 60 % exposure -circular pattern |
| M | PET Film with 70% exposure -circular pattern |
| N | PET Film with 80 % exposure -circular pattern |
| O | PET Film with 90 % exposure -circular pattern |
| p | PET Film with 100 % exposure -circular pattern |
| Q | PET Film with 70 kHz exposure - Parallelogram pattern |
| R | PET Film with 70 kHz exposure - Rectangular Pattern |
| S | PET Film with 80 kHz exposure - Parallelogram pattern |
| T | PET Film with 80 kHz exposure - Rectangular Pattern |
| U | PET Film with 100 kHz exposure - Parallelogram Pattern |
| V | PET Film with 100 kHz exposure - Rectangular Pattern |

PUSH THROUGH BLISTER PACKAGE WITH UV LASER PRODUCED ENGRAVING OR ETCHING AND METHODS OF MAKING THEREOF

CROSS-REFERENCE TO RELATED APPLICATION

This application claims the benefit of priority to U.S. provisional patent application No. 63/429,487 filed on Dec. 1, 2022, the entire contents of which are incorporated herein by reference.

BACKGROUND OF THE DISCLOSURE

Technical Field

The present disclosure relates to a blister package having a UV laser produced engraving or etching and thereby having reduced push through force and a method of making thereof.

Background

Currently, blister packs, package, or packaging (which is sometimes referred herein as pack or package), for example, used in the dispensing or delivery of medicaments such as pharmaceutical products (e.g., pills) are multicomponent in which the cavity forming material is basically plastic laminates, and the lid is aluminum based (e.g., aluminum foil or aluminum foil laminates with paper or other polymers). These blister packs could not be recycled because it is technically challenging and commercially prohibitive to separate these different materials.

Additionally, majority of the blister packs are push through packs but plastic film is not a push through structure. Known conventional perforation and plastic film weakening technologies are mostly mechanical scoring, either at partial depth of the film or making perforation. The technologies, however, have limitations: 1) the lid's barrier properties are substantially impaired, and 2) it is not possible to create the uniformly controlled push through force that is uniform throughout the lid.

Other drawback or deficiencies may also be addressed by embodiments of the present disclosure.

SUMMARY OF THE DISCLOSURE

The present disclosure is proposed to solve the problems including the above-mentioned problems and aims to provide a blister pack that 1) is easy to recycle; and 2) has the flexibility of creating the required level of push through force as demanded by the drug formulation hardness and friability and blister cavity size and shape to dispense the product safely, and/or meeting the requirement of the pack child resistant packaging and senior friendly packaging. The blister package is particularly suited for pharmaceutical packaging but applicable to other applications. In particular, the present disclosure quantitatively designs the push through force which makes the pack child resistant and/or senior friendly.

An exemplary embodiment of the present disclosure provides a blister package that may include a rupturable substrate as the lidding film; and a blister layer overlayed by the rupturable substrate, thereby making a cavity between the rupturable substate and the blister layer. The rupturable substrate may at least partially include a UV-laser formed engraving or etching that reduces push through force required for dispensing a product stored inside the cavity for customer dispensing. The rupturable substate and the blister layer may be made of the same or same class plastic, thereby making the blister package recyclable.

Another exemplary embodiment of the present disclosure provides a blister package that may include a rupturable blister layer; and a lidding film substrate over the formed blister, thereby making a blister pack with a cavity between the rupturable blister layer and the lidding film substrate, the cavity carrying a product. The lidding film substrate may be nonrupturable. The term 'nonrupturable' in some embodiments refers to the film or layer having a characteristic that it would not be ruptured by pressure applied by a human finger. The film would stretch or deform but would not break open. The rupturable blister may at least partially be engraved or etched to reduce push through force required for dispensing a product stored inside the cavity for customer dispensing. The rupturable blister layer and the lidding film substrate may be made of the same or same class plastic, thereby making the blister package recyclable.

The rupturable substrate may have barrier properties substantially the same as the rupturable substrate before forming the engraving/etching. Particularly, in the field of pharmaceutical packaging, it is important to maintain a certain level of barrier properties when weaking the substrate or lid film to facilitate the end user dispensing of the products or contents inside the blister pack.

The engraving or etching may be formed by a UV laser.

The rupturable substrate and the blister layer may be made of PET (Polyethylene Terephthalate), PVC (Polyvinyl Chloride), polyolefin, or a mixture thereof. In some embodiments, the rupturable substrate and the blister layer may be made of APET (Amorphous-Polyethylene Terephthalate), BOPET (Biaxially oriented PET), RPET (Recycled PET), PETG (Polyethylene terephthalate glycol), LDPE (Low density Polyethylene), HDPE (high density Polyethylene), PP (Polypropylene), and BOPP (Biaxially oriented Poly Propylene), or a mixture thereof.

The engraving/etching may form a pattern. Testing has evaluated the properties of certain patterns and found that the described patterns provided the desired level of push through functionality. Other patterns are contemplated and may be used. Combinations of different patterns or randomly generated patterns can be implemented. The pattern can be formed in select regions of the lid layer (such as over blister) or can be formed in areas over blisters and other areas of the lid layer. The pattern may be a check pattern. The check pattern may be a rectangular or parallelogram check pattern. Alternatively, the engraving/etching may be circular, or of any desirable design.

The engraving/etching may be formed on a portion of the rupturable substrate configured to be ruptured while dispensing the product.

The rupturable substate and the blister layer may be made of the same plastic. Preferably, the blister package may consist of one single material.

The blister layer may include more than one layer. The rupturable substrate may include more than one layer.

The rupturable substrate and the blister layer may be in direct contact with each other.

The rupturable substate may be visibly clear. The blister layer may be visibly clear.

The rupturable substrate and the blister layer may be translucent, colored or opaque.

The blister package may be child resistant and senior friendly.

In another embodiment, a method of making a blister package is provided. The method may include providing a substrate and a blister layer; sealing the substrate over the blister layer, thereby making a cavity between the rupturable substate and the blister layer; and applying a UV laser beam to the surface of the blister layer that adapts portions thereof to form an engraving or etching on the portion of the substrate. The rupturable substate and the blister layer may be made of the same or same class polymer or plastic, thereby making the blister package recyclable. The engraving or etching may adapt the substrate to be rupturable at or about the portion of the substrate.

The engraving or etching may be formed by a UV laser.

The engraving or etching using UV laser may be performed during or after film making process.

The engraving or etching using UV laser may be performed during or after blister packaging process.

Preferably, the blister package (e.g., the blister layer and lidding film combination) may consist of one single material.

BRIEF DESCRIPTION OF THE DRAWINGS

FIG. 7 is a table comprising configuration information for the force measurement in FIG. 5 in accordance with one or more embodiments of the present disclosure.

DETAILED DESCRIPTION OF THE DISCLOSURE

Figure 1:
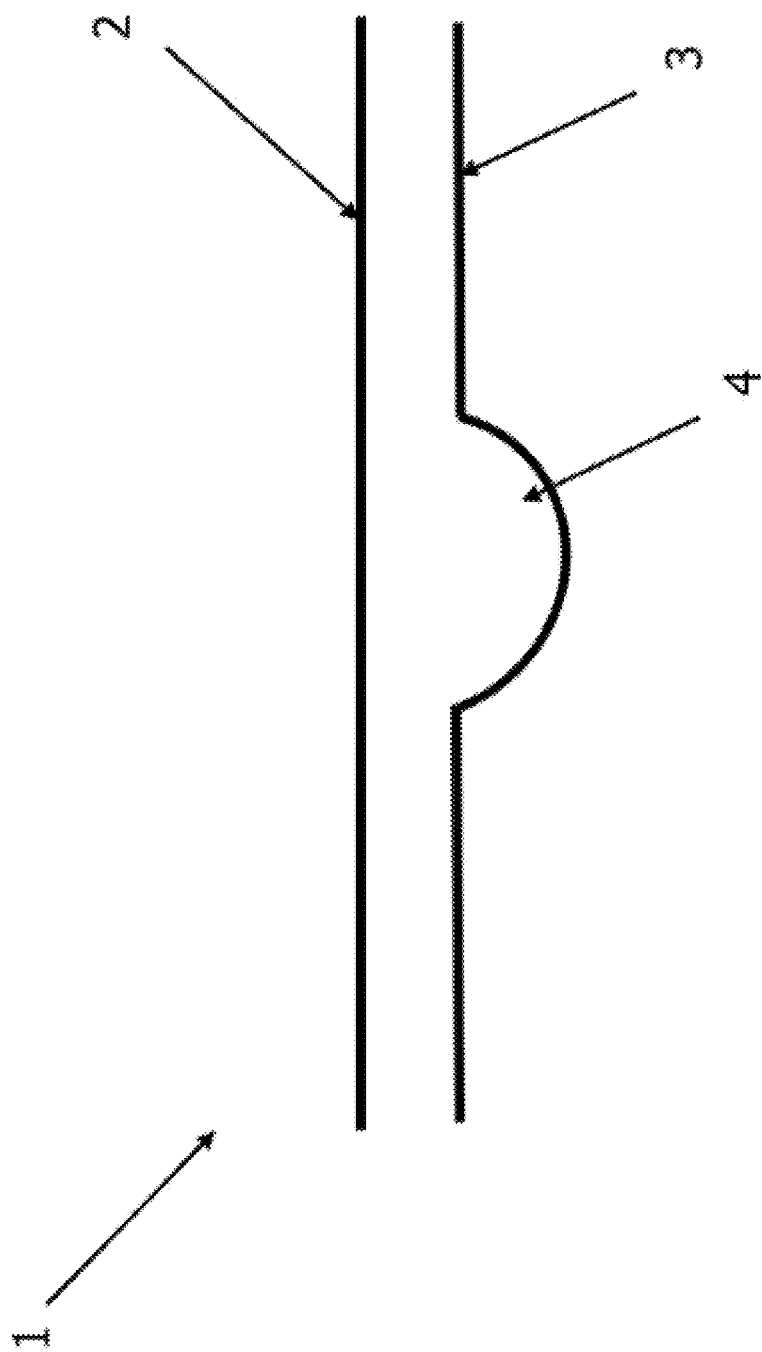
FIG. 1 is an exploded cross section view of a blister package, according to the one or more embodiments of the present disclosure.

Hereinafter, embodiments disclosed in the present specification will be described in detail with reference to the accompanying drawings. The same or similar constituent elements are assigned with the same reference numerals regardless of reference numerals, and the repetitive description thereof will be omitted.

As used herein, the term "about" refers to a range that is ±10% from the values recited within the context specifically used.

As used herein, the term "push-through force", when used with reference to a blister package system, refers to force required to allow the products or contents to break through the substrate or lid film.

As used herein, the term "single component", when used with reference to a blister package system, refers to a system that is essentially constituted with the same family of polymer across the system, for both cavity forming blister and substrate/lidding materials. As used herein, the term "polymer" is a natural or synthetic chemical compound that is composed of repeating strings of large, chemically-bonded molecules, or monomers.

As used herein, the term "same class", when used with reference to a plastic, refers to a plastic comprising the same majority of monomeric units and/or that can go to the same stream of recycling (meeting the same composition requirement for that recycling stream). As used herein, the term "plastics" are synthetic polymeric materials derived from petroleum. In some embodiments, the term "majority" means about 99%, about 98%, about 97%, about 96%, about 95%, about 94%, about 93%, about 92%, about 91%, about 90%, about 85%, about 80%, about 75%, about 70%, about 65%, about 60%, about 55%, about 50%.

As used herein, the term "consist essentially of", when used with reference to a blister package, means that the blister package can have minor amounts of other ingredients that would not materially affect the present disclosure's function and/or objective in the amount of less than 10% of the total weight of the blister package.

As used herein, the term "rupturable", when used with reference to a part of a blister package, means that the part at least partially forms an engraving or etching to reduce push through force of the part.

As used herein, the quantified "push through force" is measured using a method described in the United States Pharmacopeia chapter 382 (using 50 mm/min as a test speed) and a Shimadzu EZ-LX or Zwick for a push through force apparatus.

As used herein, the term "visibly clear" means that the visible light transmission of the composition is greater than 60%, preferably greater than 80%. Translucent means visible light transmission may be less than 60% and opaque means the light transmission may be less 10%. Light transmission of the composition is measured using UV-Vis Spectrophotometry, which determines the absorption or transmission of light by a sample.

Figure 2:
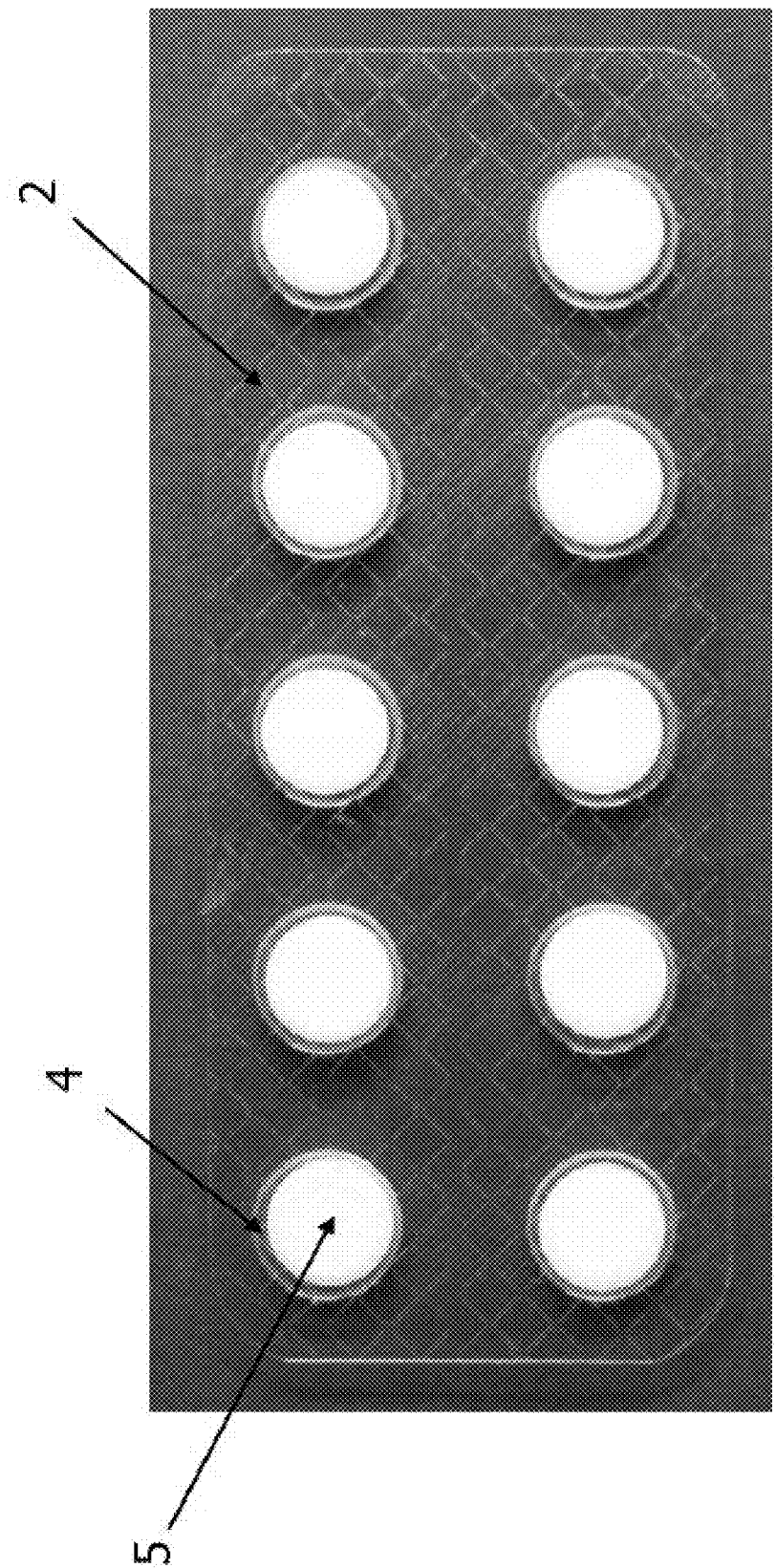
FIG. 2 is a perspective view of an assembled blister package of FIG. 1 containing a product or a content, according to one or more embodiments of the present invention.

In FIG. 1, provided is an exploded cross section view of a blister package 1 that may include a rupturable substrate or lid film 2; and a blister layer 3 overlayed by the substrate or lid film 2, thereby making a cavity 4 between the rupturable substate or lid film 2 and the blister layer 3. When the lid film and the blister layer are sealed, the seal strength is preferably at least about 0.3 kg/cm. The seal strength is high enough to prevent a child from opening the seal. As shown in FIGS. 1A & 2, the rupturable substrate or lid film 2 may at least partially be engraved or etched to reduce push through force required for dispensing a content or product 5 stored inside the cavity 4 for customer dispensing. Preferably, the content or product 5 is a solid dosage form pharmaceutical product.

The rupturable substate or lid film 2 and the blister layer 3 may be made of the same or same class plastic, thereby making the blister package recyclable. Preferably, the rupturable substate or lid film 2 and the blister layer 3 may be made of the same polymer or plastic. The rupturable substrate or lid film 2 and the blister layer 3 may be made of APET (Amorphous-Polyethylene Terephthalate), BOPET (Biaxially oriented PET), RPET (Recycled PET), PETG (Polyethylene terephthalate glycol), PVC (Polyvinyl Chloride) or Polyolefin such as LDPE (Low density Polyethylene), HDPE (High density Polyethylene) and PP (Polypropylene), or a mixture thereof. Preferably, the rupturable substate or lid film 2 and the blister layer 3 may be made of a single component. More preferably, the rupturable substate or lid film 2 and the blister layer 3 may consist of one single material—APET. Most preferably, the rupturable substate or lid film 2 and the blister layer 3 may consist essentially of or consist of APET. APET has been found to be particularly suitable for embodiments of the present disclosure.

The UV-laser engraved or etched rupturable substrate or lid film 2 may have barrier properties substantially the same as the rupturable substrate or lid film 2 before forming the engraving/etching. Preferably, the engraved or etched rupturable substrate or lid film 2 may have barrier properties that are about 80% of the rupturable substrate or lid film 2 before forming the engraving/etching. More preferably, the engraved or etched rupturable substrate or lid film 2 may have barrier properties that are about 90% of the rupturable substrate or lid film 2 before forming the engraving/etching. More preferably, the engraved or etched rupturable substrate or lid film 2 may have barrier properties that is about the same as the rupturable substrate or lid film 2 before forming the engraving/etching.

In FIGS. 1 and 2, the rupturable substrate or lid film 2 may have the engraving or etching 6-8 micron deep. The engraving or etching 6-8 micron deep may be formed by a UV laser application. When a UV laser is used, the depth of UV laser scoring can be controlled as desired, for example, about 5 microns to about 24 microns, depending on the thickness of the substrate or lid film 2 and the required push through force. The scoring depth can vary depending on the kind of plastics or polymer. The more or the deeper a UV laser etches or engraves, the lower the required push through force. In some embodiments, the thickness of the substrate or lid film 2 has a thickness from about 10 microns to about 100 microns. Preferably, the thickness is between about 18 and about 35 microns. In some embodiments, the thickness is from about 10 microns to about 20 microns. In some embodiments, the thickness is from about 20 microns to about 30 microns. In some embodiments, the thickness is from about 30 microns to about 40 microns. In some embodiments, the thickness is from about 40 microns to about 50 microns. In some embodiments, the thickness is from about 50 microns to about 60 microns. In some embodiments, the thickness is from about 60 microns to about 70 microns. In some embodiments, the thickness is from about 70 microns to about 80 microns. In some embodiments, the thickness is from about 80 microns to about 90 microns. In some embodiments, the thickness is from about 90 microns to about 100 microns.

The engraving/etching 6-8 may form a pattern. The pattern may be a check pattern. The check pattern may be a rectangular 6 or parallelogram 7 check pattern. Alternatively, the engraving/etching may be circular. The pattern is not limited to the shown exemplary pattern; other patterns that can form the etching or engraving can be used as well within the scope of the various embodiments.

The engraving/etching may be formed on a portion of the rupturable substrate or lid film 2 configured to be ruptured to dispense the product or content 5. FIG. 2 shows engraving/etching that is formed at or about the portion of the rupturable substrate or lid film 2 such that the engraving or etching can reduce push through force required for dispensing the product or content 5 stored inside the cavity 4 for customer dispensing. In some embodiments, the engraving/etching may be formed on a portion of the rupturable substrate or lid film 2 that is placed under or above or that corresponds to the blister layer 3. The portion of the rupturable substrate or lid film 2 may be a circular area that is formed when the blister layer 3 is sealed onto the rupturable substrate or lid film 2. In some embodiments, the engraving/etching may be formed only on a portion of the rupturable substrate or lid film 2 that is placed under or above the blister layer 3.

The blister layer 3 may comprise more than one layer. For example, the blister layer 3 may comprise three layers. The rupturable substrate or lid film 2 may comprise more than one layer. For example, the blister layer 3 may comprise three layers.

The rupturable substrate or lid film 2 and the blister layer 3 may be in direct contact with each other. Alternatively, an additional layer can be placed between the rupturable substrate or lid film 2 and the blister layer 3 may be in direct contact with the additional layer. In some embodiments, the additional layer may comprise more than one layer.

The rupturable substate or lid film 2 may be visibly clear. The blister layer 3 may be visibly clear. Preferably, the rupturable substrate or lid film 2 is visibly clearly enough to recognize which content or product 5 is placed inside the cavity between the substrate or lid film 2 and the blister layer 3. This can allow the user to visually identify the medicine inside the cavity from the color, shape, or other characteristic of the medicine.

The rupturable substrate may be made with colored film or opaque to provide UV-Vis light protection to the product packed in.

The blister package 1 may be child resistant and senior friendly. Preferably, the blister package 1 may be child resistant and senior friendly, according to the guidance or requirement of an agency or authority such as FDA, CPSC (Consumer product safety commission). In some embodiments, the push through force of the substrate or lid film 2 of the blister package 1 is higher than the child resistant requirement and the senior friendly requirement mandated by an agency or authority.

In another embodiment, a method of making a blister package is provided. The method may include the step of providing a substrate or lid film 2 and a blister layer 3. The process starts with extrusion of polymer resin formulation, preferably APET, into a film of required thickness for thermoforming and lidding requirement. Applying a UV laser, under controlled circumstances, to the surface of the film that configures limited defined rupturable areas (in correspondence to the blisters) using UV-laser deformation (e.g., etching) that adapts the film to have the desired rupturable state in a certain targeted or focused area (e.g., because the thickness is reduced in predefined patterns). The blister layer 3 is created by thermoforming a film into the desired shape of a cavity as per the size and shape of the drug product to be packed using a thermoforming machine.

The method may further include the step of sealing the blister layer 3 with the rupturable substrate or lid film 2, thereby making a cavity 4 between the rupturable substate or lid film 2 and the blister layer 3. Before sealing the blister layer 3 with the rupturable substrate or lid film 2, a product or content 5 may be placed in the cavity 4.

The method may further include the step of forming an engraving or etching 6-8 on a portion of the rupturable substrate or lid film 2. For this step, the substrate or lid film 2 is then passed through the UV laser application to create a pattern or patterns on the film. For example, the design of patterns or the density, frequency and intensity of the UV laser application are the variables to achieve the desired level of weakening without losing or substantially losing its original barrier property. The combination of these properties may be controlled to get the desired output specified by the customer in the final blister pack 1.

In some embodiments, it is possible to operate the step of forming an engraving or etching 6-8 on a portion of the rupturable substrate or lid film 2 earlier than the step of sealing the rupturable substrate or lid film 2 over the blister layer 3. After the engraving or etching step, a post engraving or etching step may be further implemented. In some embodiments, a pre-engraving or etching treatment may be implemented to the substrate or lid film 2, for example, for the purpose of improving the engraving or etching performance.

The engraving/etching may be formed on a portion of the rupturable substrate or lid film 2 configured to be ruptured while dispensing the product or content 5. In FIG. 2, an engraving/etching may be formed at or about the portion of the rupturable substrate or lid film 2 such that the engraving or etching can reduce push through force required for dispensing the product or content 5 stored inside the cavity 4 for customer dispensing. This can include activating the laser to start the engraving/etching inside the portion of the lid that overlays the blister. If desired, the engraving/etching may be performed to cross into portions of the lid that are outside of the boundary of the blister on the opposing side. The laser power can preferably be at about constant (with respect to level of application to the surface) throughout the etching/engraving process that forms the discussed rupturable characteristic on the surface.

FIGS. 3A-3I (provided for a comparative testing) and FIGS. 4A-4F (according to embodiments of the present disclosure) contrast a square pattern etched or engraved by a $CO_2$ laser on a lid film that is more noticeable and embossing than a square pattern etched or engraved by a UV laser on a lid film. The comparison between a square pattern etched or engraved by a $CO_2$ laser and a UV laser shows improvement of engravings or etchings created by a UV laser over ones created by a $CO_2$ laser. In some embodiments, the pattern may be parallelogram, circle, rectangle, or etc.

Figure 3A:
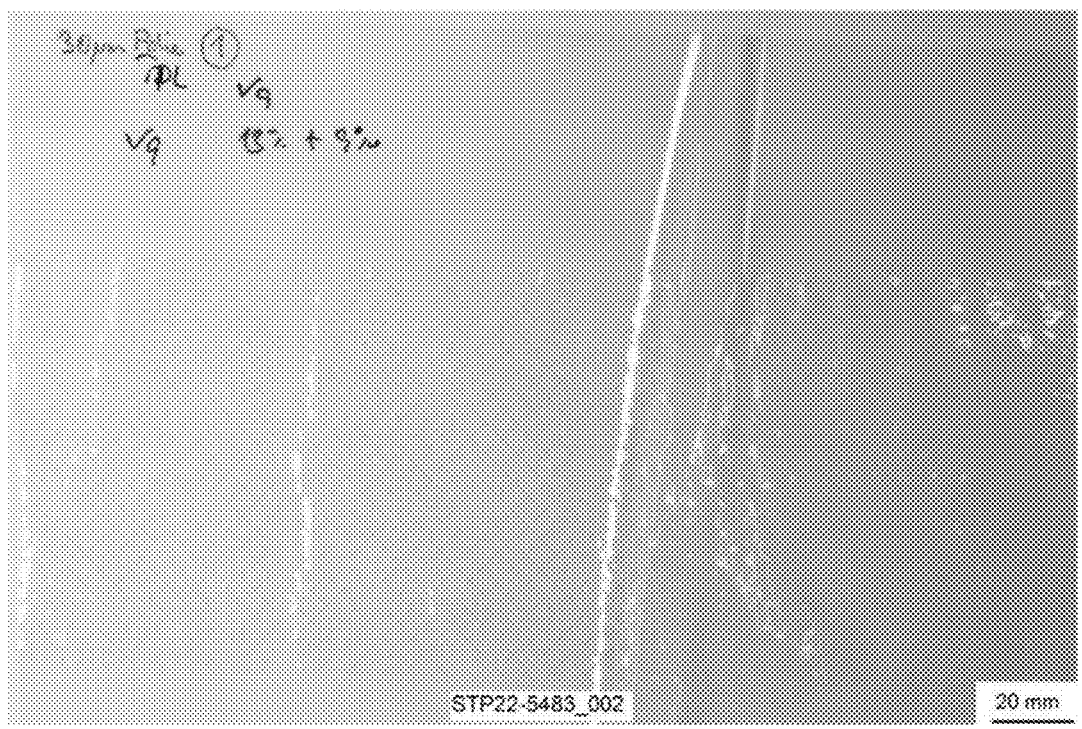
FIG. 3A shows a lid film (30 μm thickness) etched or engraved with a square pattern using a $CO_2$ laser.
Figure 3B:
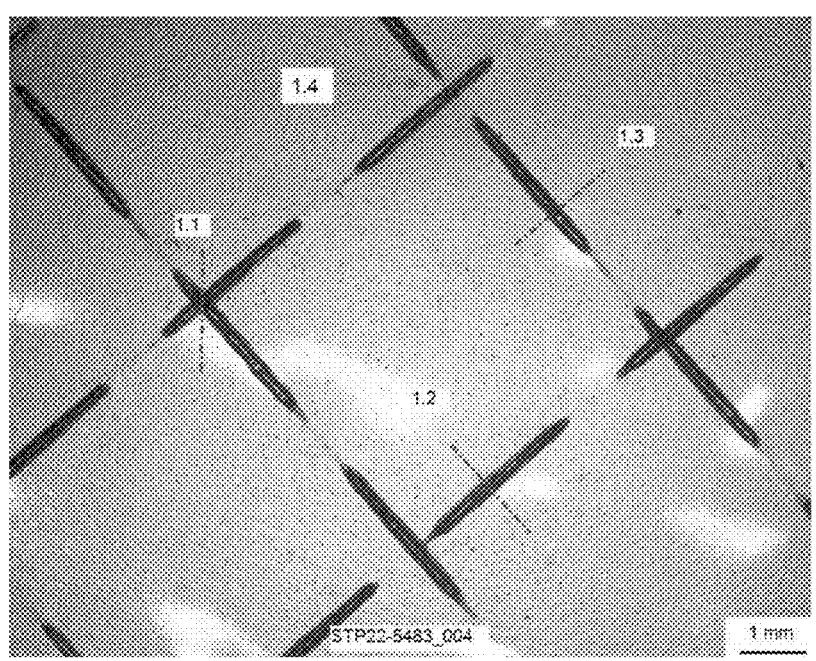
FIG. 3B is an enlarged view of the FIG. 3A.
Figure 3C:
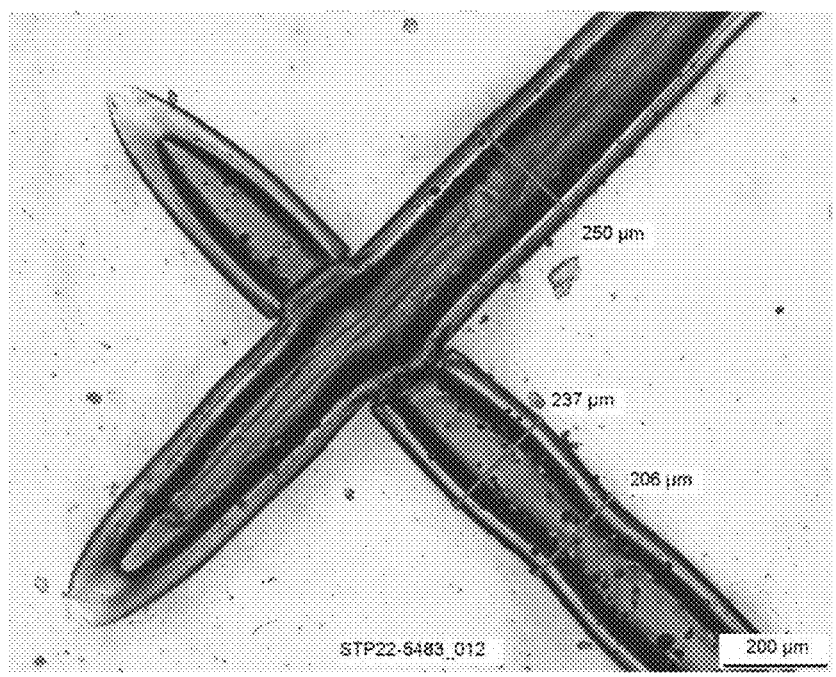
FIG. 3C is a top view of the portion signified by '1.1' in the FIG. 3B.
Figure 3D:
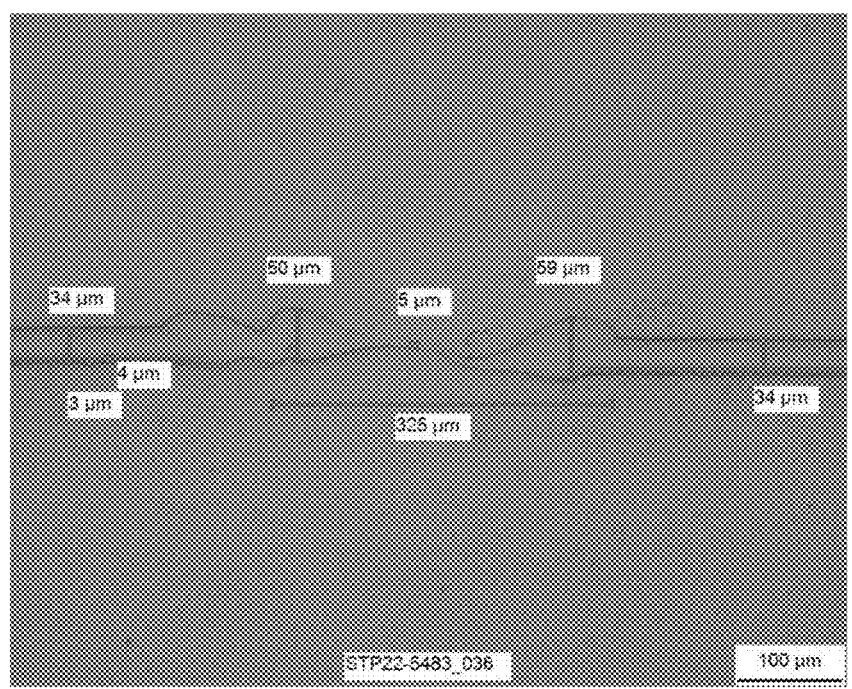
FIG. 3D is a cross-section view of the portion signified by '1.1' in the FIG. 3B.
Figure 3E:
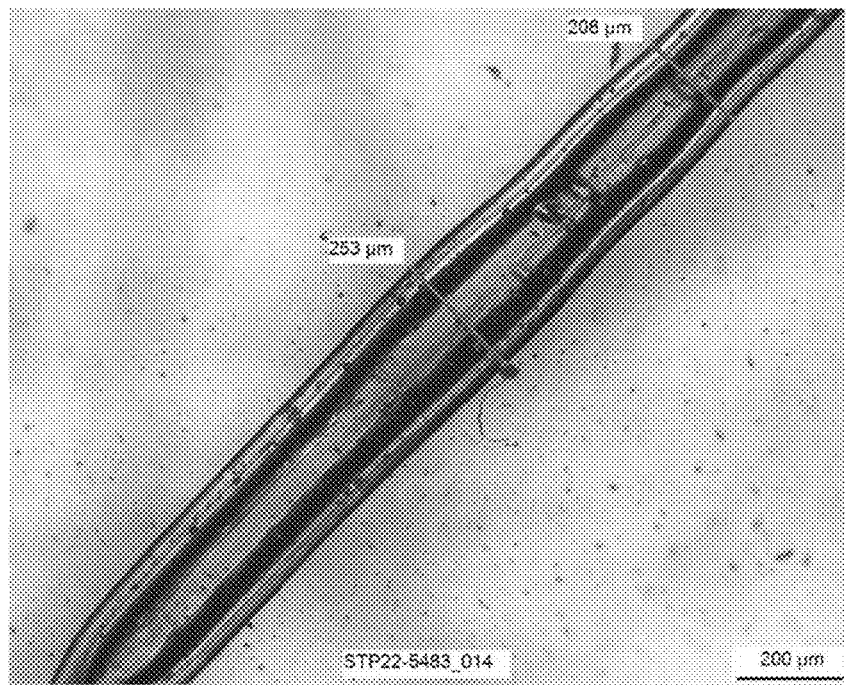
FIG. 3E is a top view of the portion signified by '1.2' in the FIG. 3B.
Figure 3F:
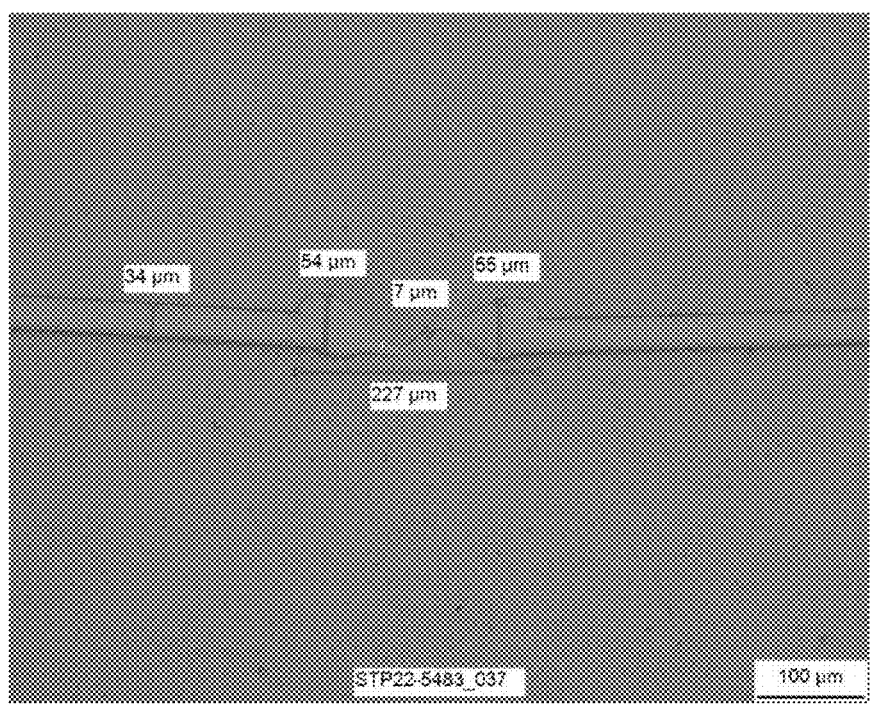
FIG. 3F is a cross-section view of the portion signified by '1.2' in the FIG. 3B.
Figure 3G:
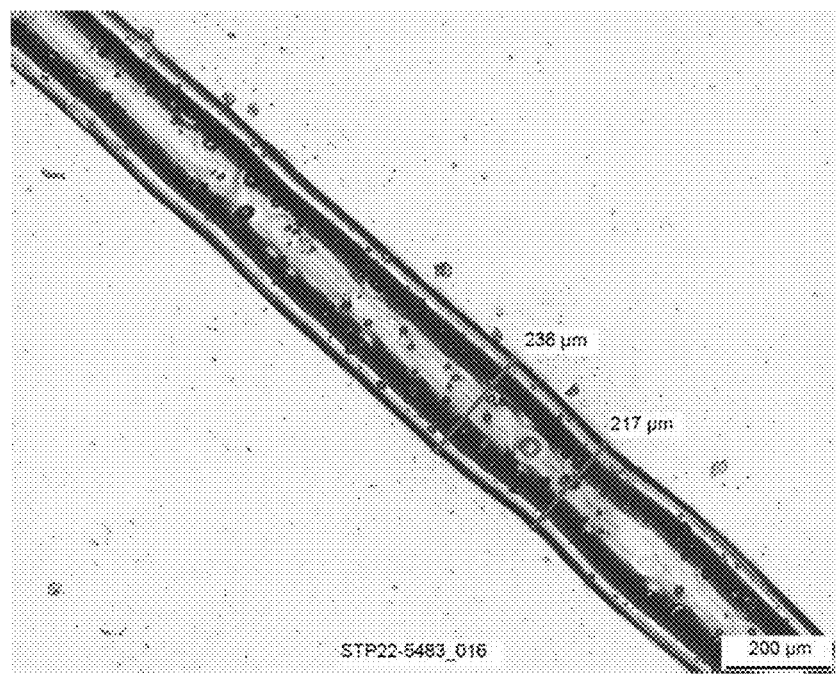
FIG. 3G is a top view of the portion signified by '1.3' in the FIG. 3B.
Figure 3H:
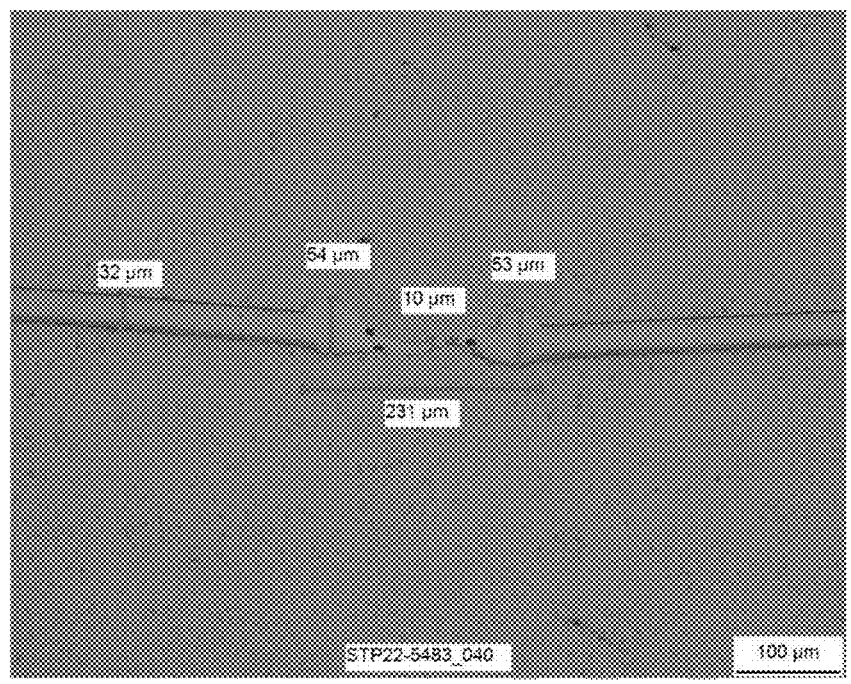
FIG. 3H is a cross-section view of the portion signified by '1.3' in the FIG. 3B.
Figure 3I:
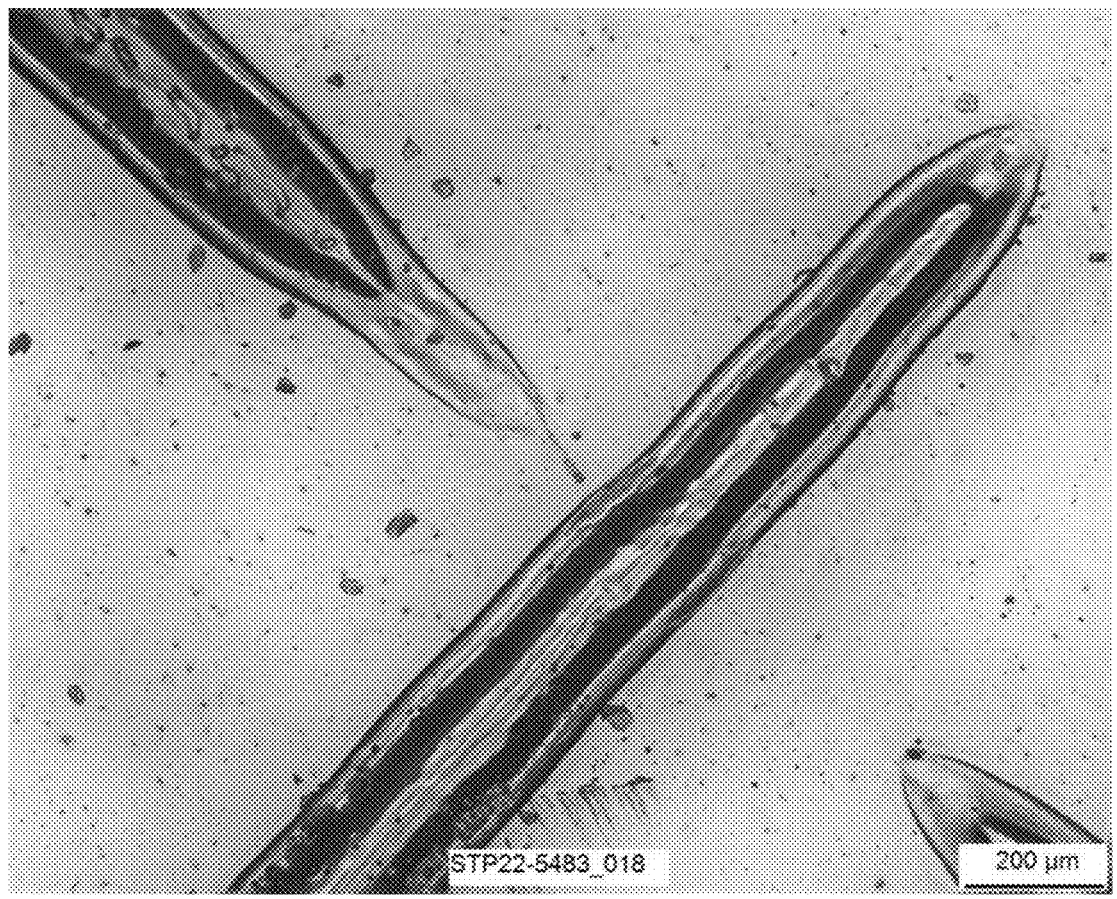
FIG. 3I is a top view of the portion signified by '1.4' in the FIG. 3B.

FIG. 3C is a top view of the portion signified by '1.1' in the FIG. 3B. FIG. 3D is a cross-section view of the portion signified by '1.1' in the FIG. 3B. FIG. 3E is a top view of the portion signified by '1.2' in the FIG. 3B. FIG. 3F is a cross-section view of the portion signified by '1.2' in the FIG. 3B. FIG. 3G is a top view of the portion signified by '1.3' in the FIG. 3B. FIG. 3H is a cross-section view of the portion signified by '1.3' in the FIG. 3B. FIG. 3I is a top view of the portion signified by '1.4' in the FIG. 3B.

Figure 4A:
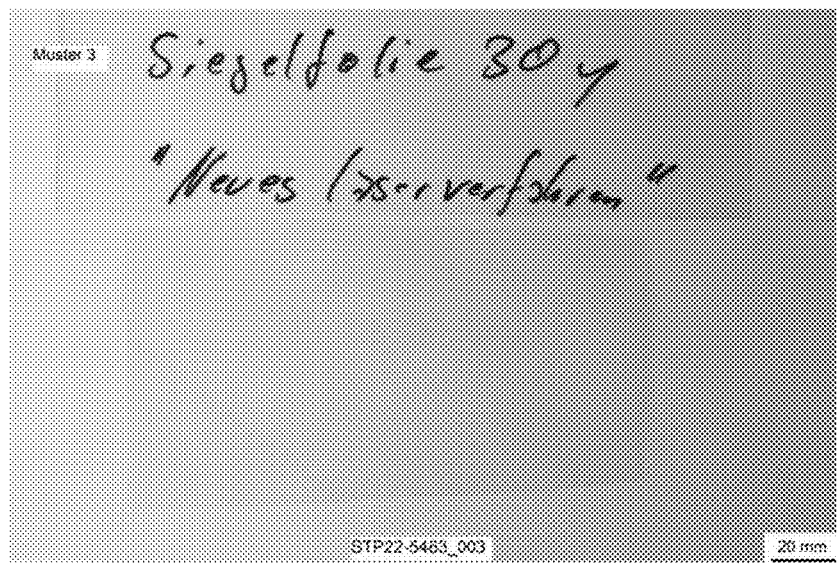
FIG. 4A shows a lid film (30 μm thickness) etched or engraved with a square pattern using a UV laser, according to one or more embodiments of the present invention.
Figure 4B:
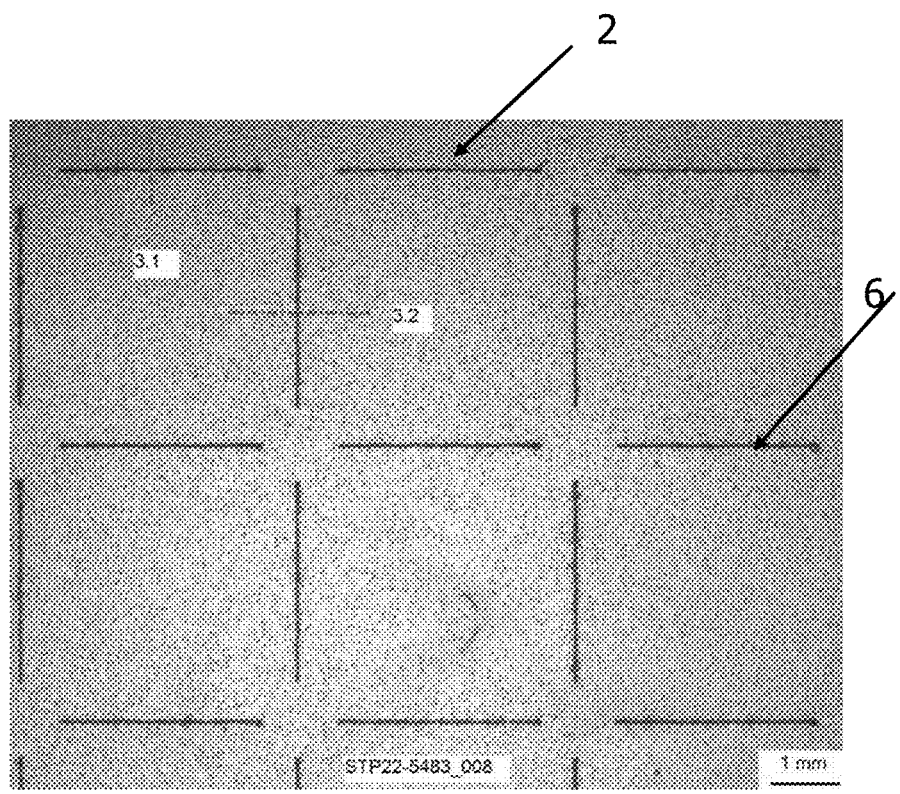
FIG. 4B is an enlarged view of the FIG. 4A, according to one or more embodiments of the present disclosure.
Figure 4C:
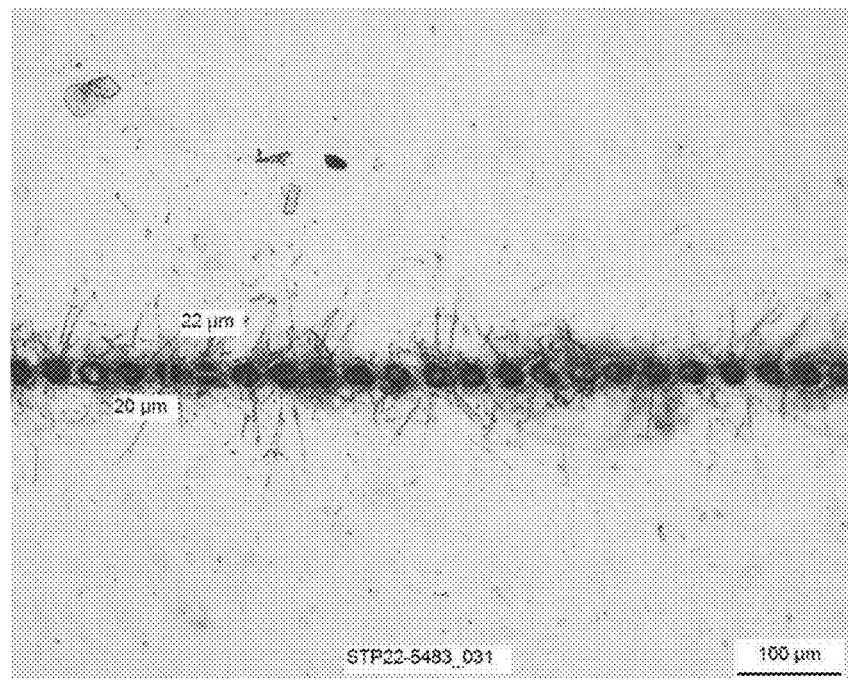
FIG. 4C is a top view of the portion signified by '3.1' in the FIG. 4B, according to one or more embodiments of the present disclosure.
Figure 4D:
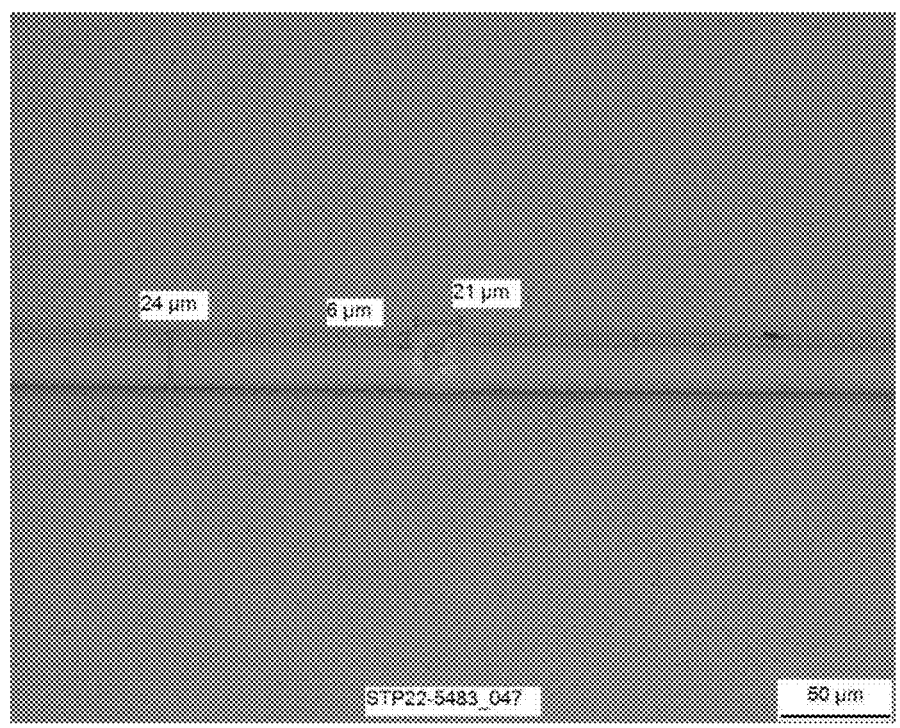
FIG. 4D is a cross-section view of the portion signified by '3.1' in the FIG. 4B, according to one or more embodiments of the present disclosure.
Figure 4E:
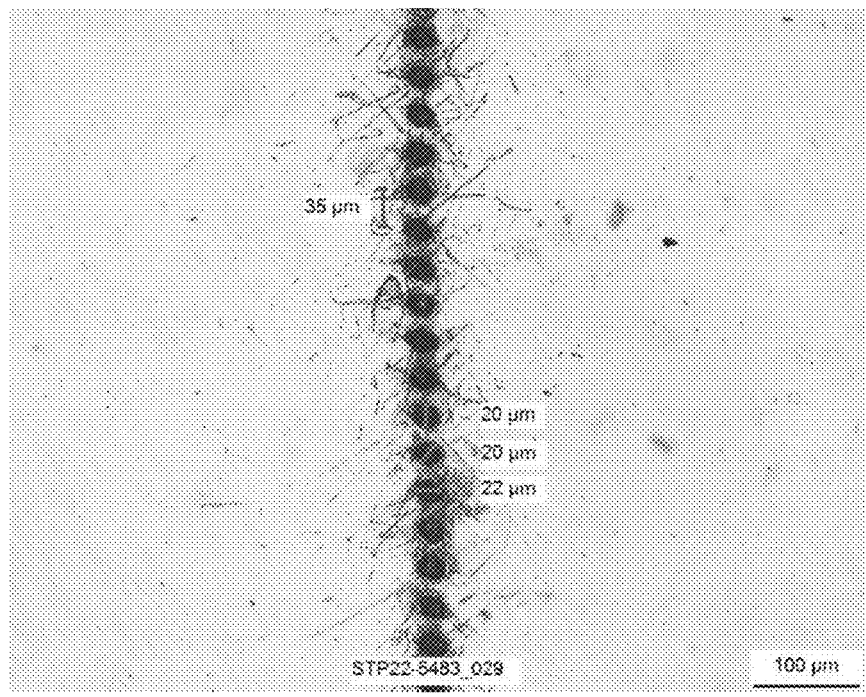
FIG. 4E is a top view of the portion signified by '3.2' in the FIG. 4B, according to one or more embodiments of the present disclosure.
Figure 4F:
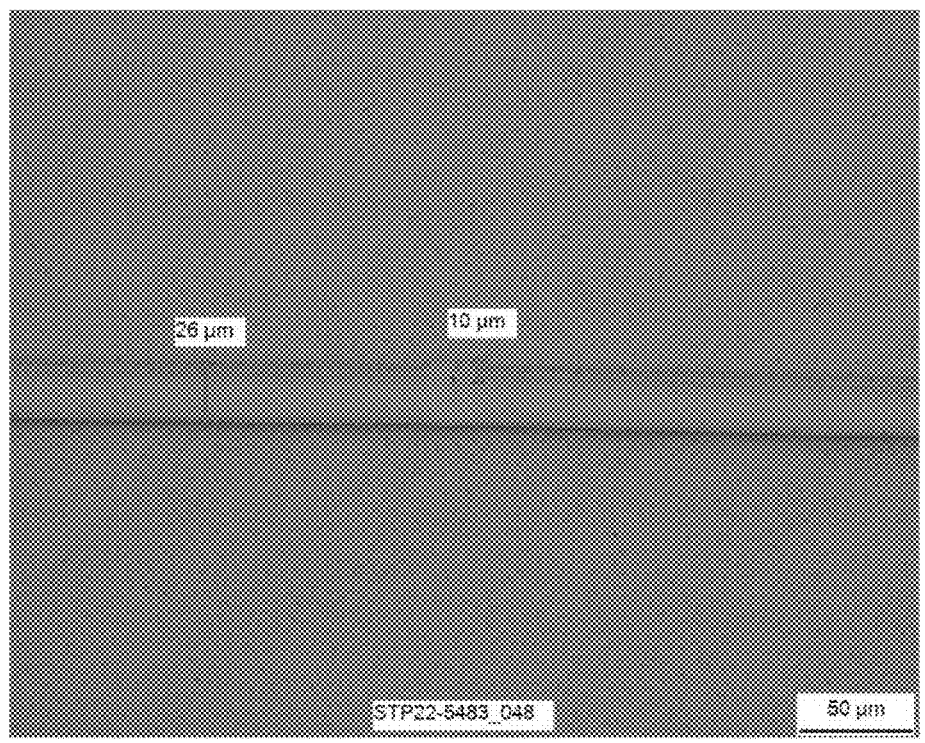
FIG. 4F is a cross-section view of the portion signified by '3.2' in the FIG. 4B, according to one or more embodiments of the present disclosure.

FIG. 4C is a top view of the portion signified by '3.1' in the FIG. 4B. FIG. 4D is a cross-section view of the portion signified by '3.1' in the FIG. 3B. FIG. 4E is a top view of the portion signified by '3.2' in the FIG. 4B. FIG. 4F is a cross-section view of the portion signified by '3.2' in the FIG. 4B.

The $CO_2$ laser engravings on the lid film created as shown in FIG. 3C-3I, show a flat shape with substantially raised flanks, and the UV laser engravings on the film, as shown in 4C-4F, show dots at a distance with minor indentations, which may contribute to the difference in terms of the noticeability and embossing of the patterns on the lid films.

In some embodiments, the distance between dots may be about 35 μm. In some embodiments, the distance between dots may be from about 5 μm to about 50 μm. In some embodiments, the distance between dots may be from about 5 μm to about 10 μm. In some embodiments, the distance between dots may be from about 10 μm to about 15 μm. In some embodiments, the distance between dots may be from about 15 μm to about 20 μm. In some embodiments, the distance between dots may be from about 25 μm to about 30 μm. In some embodiments, the distance between dots may be from about 30 μm to about 35 μm. In some embodiments, the distance between dots may be from about 35 μm to about 40 μm. In some embodiments, the distance between dots may be from about 40 μm to about 45 μm. In some embodiments, the distance between dots may be from about 45 μm to about 50 μm.

In some embodiments, the distance between dots may be about less than 300% of the diameter of the dots. In some embodiments, the distance between dots may be about less than 200% of the diameter of the dots. In some embodiments, the distance between dots may be about less than 100% of the diameter of the dots. In some embodiments, the distance between dots may be about less than 90% of the diameter of the dots. In some embodiments, the distance between dots may be about less than 80% of the diameter of the dots. In some embodiments, the distance between dots may be about less than 70% of the diameter of the dots. In some embodiments, the distance between dots may be about less than 60% of the diameter of the dots. In some embodiments, the distance between dots may be about less than 50% of the diameter of the dots. In some embodiments, the distance between dots may be about less than 40% of the diameter of the dots. In some embodiments, the distance between dots may be about less than 30% of the diameter of the dots. In some embodiments, the distance between dots may be about less than 20% of the diameter of the dots. In some embodiments, the distance between dots may be about less than 10% of the diameter of the dots.

In some embodiments, the minor indentations from the lid film surface before engravings may be less than 50% of the depth caused by engravings. In some embodiments, the minor indentations from the lid film surface before engravings may be less than 40% of the depth caused by engravings. In some embodiments, the minor indentations from the lid film surface before engravings may be less than 30% of the depth caused by engravings. In some embodiments, the minor indentations from the lid film surface before engravings may be less than 20% of the depth caused by engravings. In some embodiments, the minor indentations from the lid film surface before engravings may be less than 10% of the depth caused by engravings. In some embodiments, the minor indentations from the lid film surface before engravings may be less than 5% of the depth caused by engravings.

Figure 5A:
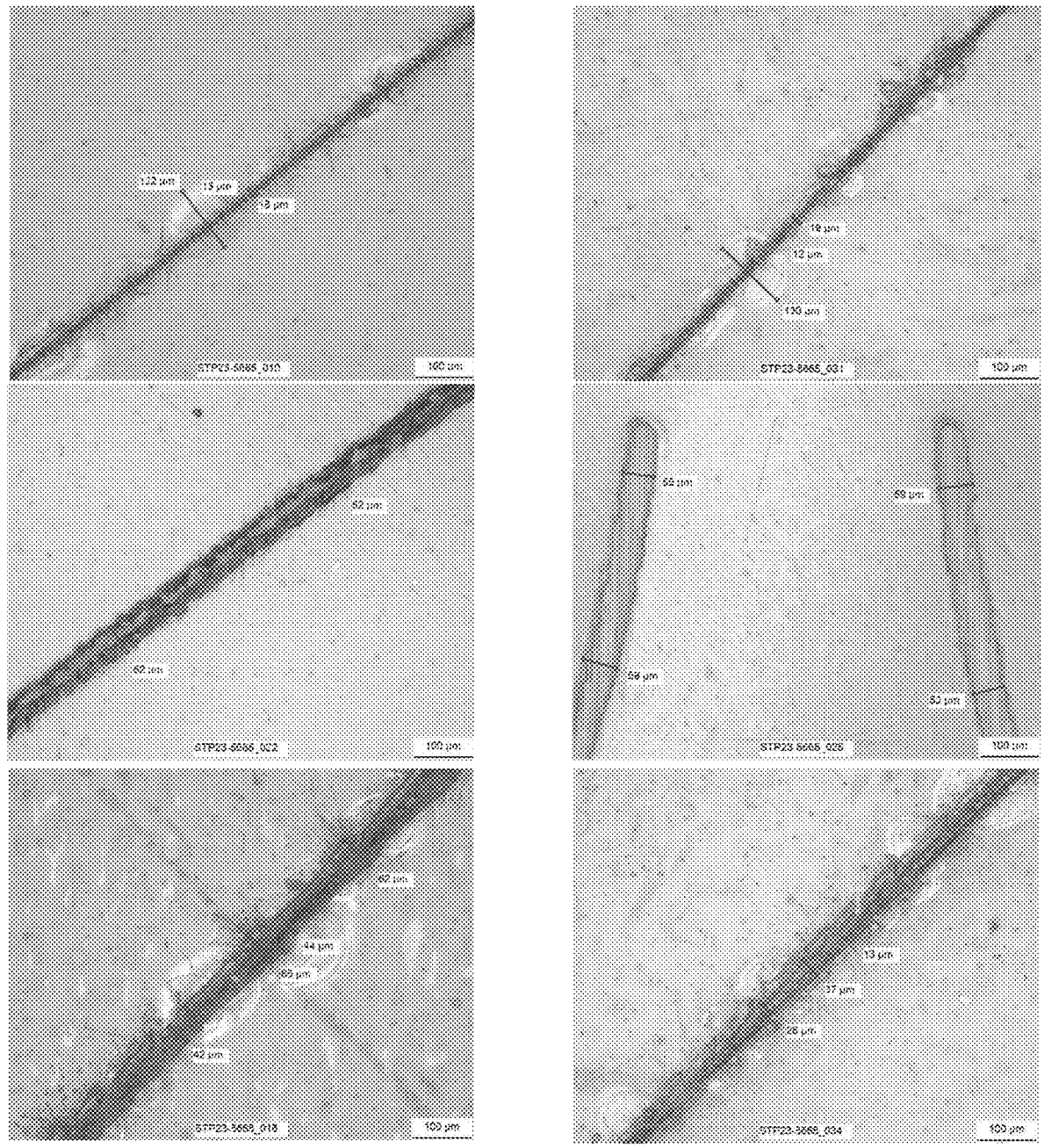
FIG. 5A shows a top view of a lid film (30 μm thickness) engraved/etched using a UV laser (left top); a top view of a lid film (30 μm thickness) of a blister sample engraved/ etched using a UV laser (right top); a top view of a lid film (51 μm thickness) engraved/etched using a UV laser (left bottom); and a top view of a lid film (51 μm thickness) of a blister sample engraved/etched using a UV laser (right bottom), according to one or more embodiments of the present disclosure.
Figure 5B:
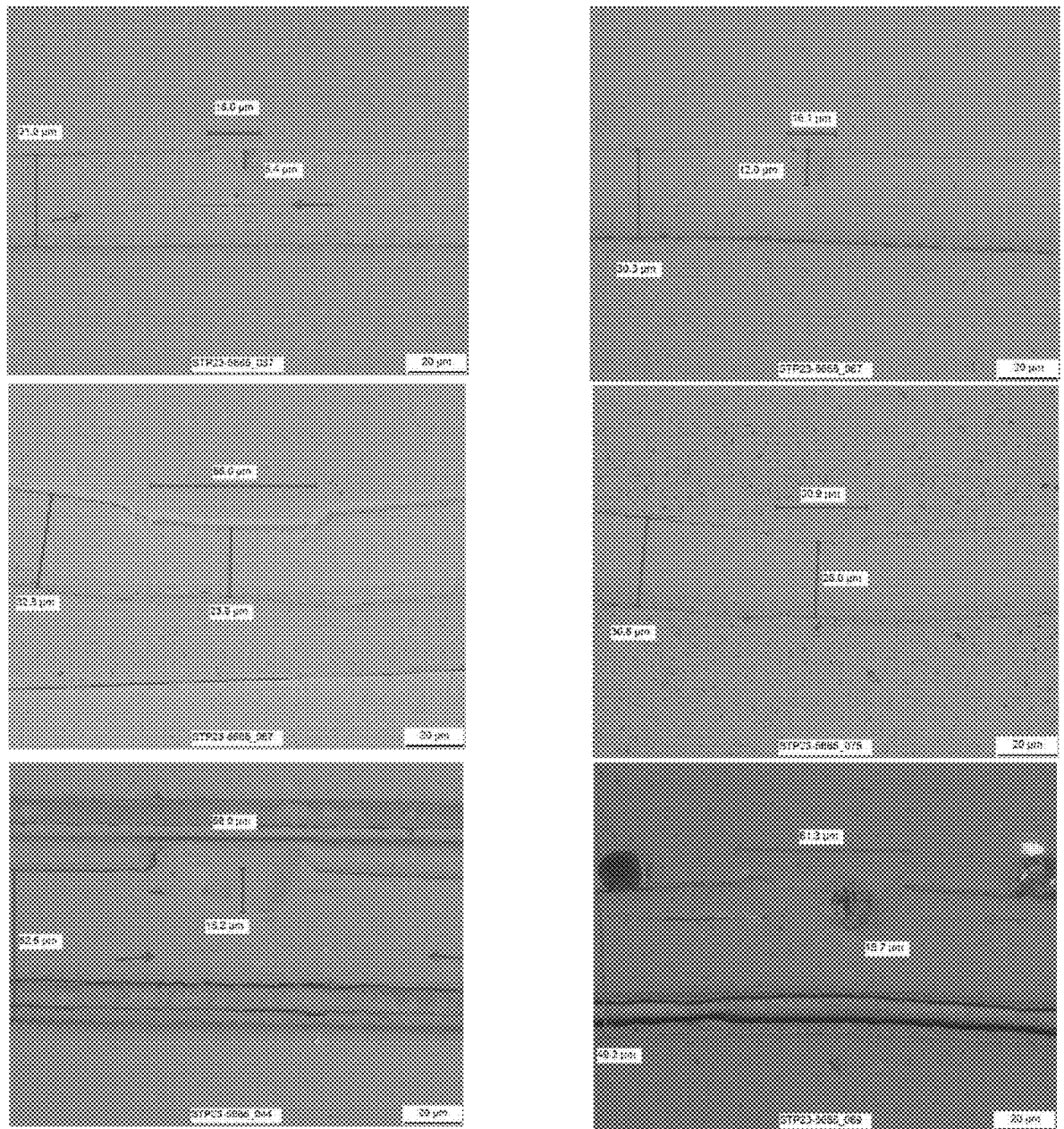
FIG. 5B shows a cross-section view of a lid film (30 μm thickness) engraved/etched using a UV laser (left top); a cross-section view of a lid film (30 μm thickness) of a blister sample engraved/etched using a UV laser (right top); a cross-section view of a lid film (51 μm thickness) engraved/ etched using a UV laser (left bottom); and a cross-section view of a lid film (51 μm thickness) of a blister sample engraved/etched using a UV laser (right bottom), according to one or more embodiments of the present disclosure.

FIG. 5A shows a top view of a lid film (30 μm thickness) engraved/etched using a UV laser (left top); and a top view of a lid film (30 μm thickness) of a blister sample engraved/etched using a UV laser (right top). FIG. 5B shows a cross-section view of a lid film (30 μm thickness) engraved/etched using a UV laser (left top); and a cross-section view of a lid film (30 μm thickness) of a blister sample engraved/etched using a UV laser (right top). This lid film corresponds to the serial number 12 of the FIG. 8. Water vapor transmission rate of this lid film is 4.388 g/m$^2$·day.

For the blister sample, the engraving is created and examined in the unsealed area (e.g., above the cavity). A potential change/stretch due to the sealing process compared to the lid film without a sealing (FIGS. 5A/5B, left top) was expected in the blister sample (FIGS. 5A/5B, right top) but no significant change or stretch was observed in terms of the depth and width of the engraving/etching.

For the both samples, the width of the engravings varies greatly with a certain regularity. For the lid film sample (FIG. 5A, left top), both the width and depth of the engraving are substantially inhomogeneous.

The cross section of the lid film (FIG. 5A, left top) shows a line below the engraving approximately in the middle of the film, which presumably represent a crack or gap. In terms of dimensions, the extent of this "column" corresponds to the circular to oval bright areas that are partially visible in the top view. These gaps are probably delaminations (layer separations) which create these bright areas through light scattering. The columns are marked with arrows in the picture.

FIG. 5A also shows a top view of a lid film (51 μm thickness) engraved/etched using a UV laser (left bottom); and a top view of a lid film (51 μm thickness) of a blister sample engraved/etched using a UV laser (right bottom). This lid film corresponds to the serial number 15 of the FIG. 8. Water vapor transmission rate of this lid film is 3.551 g/m$^2$·day. FIG. 5B also shows a cross-section view of a lid film (51 μm thickness) engraved/etched using a UV laser (left bottom); and a cross-section view of a lid film (51 μm thickness) of a blister sample engraved/etched using a UV laser (right bottom).

For the blister sample, the engraving is created and examined in the unsealed area (e.g., above the cavity). A potential change/stretch due to the sealing process compared to the lid film without a sealing (FIGS. 5A/5B, left bottom) was expected in the blister sample (FIGS. 5A/5B, right bottom) but no significant change or stretch was observed in terms of the depth and width of the engraving/etching.

For the both samples, the width of the engravings varies greatly with a certain regularity. For the lid film sample (FIG. 5A, left bottom), both the width and depth of the engraving are substantially inhomogeneous.

The cross section of the lid film (FIG. 5A, left bottom) shows a line below the engraving approximately in the middle of the film, which presumably represents a crack or gap. In terms of dimensions, the extent of this "column" corresponds to the circular to oval bright areas that are partially visible in the top view. These gaps are probably delaminations (layer separations) which create these bright areas through light scattering. The columns are marked with arrows in the picture.

Figure 6:
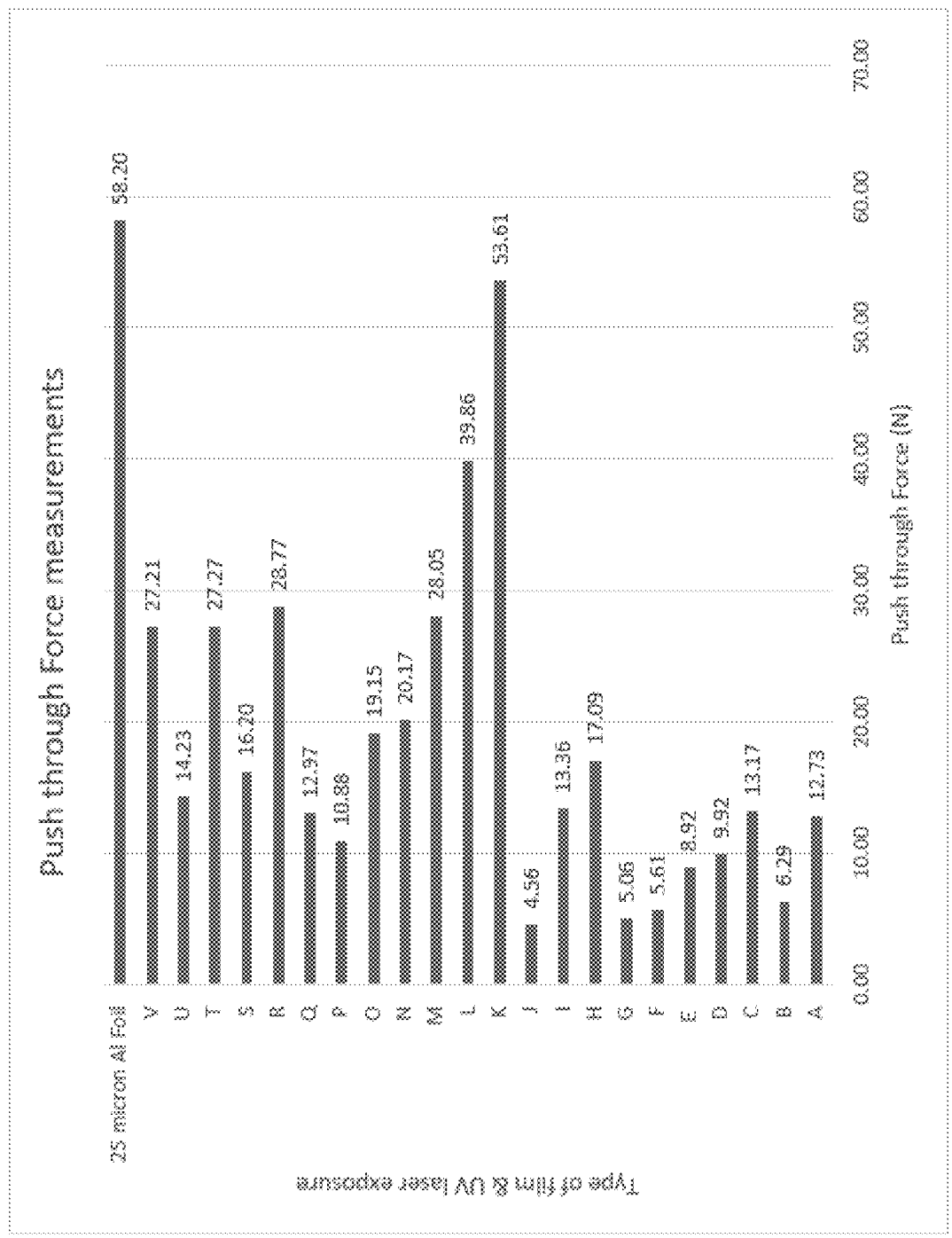
FIG. 6 shows the measured push through force (N) for each UV laser etched or engraved substrates or lidding films in accordance with one or more embodiments of the present disclosure.

FIG. 6 shows the measured push through force (N) for each UV laser etched or engraved substrates or lidding films. For the etching or engraving, Linear Samurai UV Laser Marking System from DPSS Lasers Inc. was used. Details about the system can be found from https://static1.squarespace.com/static/58ffb1573a04119b0e161612/t/5bad29fae2c48321ec929253/1538075130912/DPSS+Samurai+Linear+3500+Datasheet+Rev+*B.pdf, which is incorporated by reference. In addition to FIG. 6, PET Lidding Foil with a parallelogram check pattern (W) with 70% UV laser strength or power exposure (100% power=20 W) results in 52.4 N push through force; and PET Lidding Foil with a rectangular check pattern (X) with 70% UV laser strength or power exposure (100% power=20 W) results in 61.4 N push through force; and 30 μm APET Blisters (Y) (corresponding to the trial no. 13 in FIG. 7) results in 36.9 N push through force. To clarify, in context, the term foil is not being used to refer to a thin metal sheet since embodiments of the present disclosure are related to plastic lids and blister layers.

FIG. 7 is a table showing the certain testing parameters for the data in FIG. 6. The lid films have a thickness generally in the range of from about 10 microns to about 100 microns for the substrates or lidding films after UV etching or engraving. The depth of etching in the testing ranged from about 6 microns to about 10 microns. The data shows that it is possible to control the push through force by varying the variables of the UV laser application (e.g., the density, frequency and intensity of laser application). The etching or engraving pattern design can be also varied to further control the push through force. In practical applications, each customer application of a blister package may require different requirements and the manufacturing process can be adjusted accordingly.

In general, the more laser exposure, the more depth of etching/engraving and thus the less push through force (see the samples A and B in FIG. 6). Also, the higher laser strength or power, the more depth of etching/engraving and thus the less push through force (see the samples C-H and K-P in FIG. 6). The larger the pattern size, the less push through force (see the samples I and J in FIG. 6). The higher laser frequency, the less push through force (see the samples R, T, and V in FIG. 6).

Figure 8:
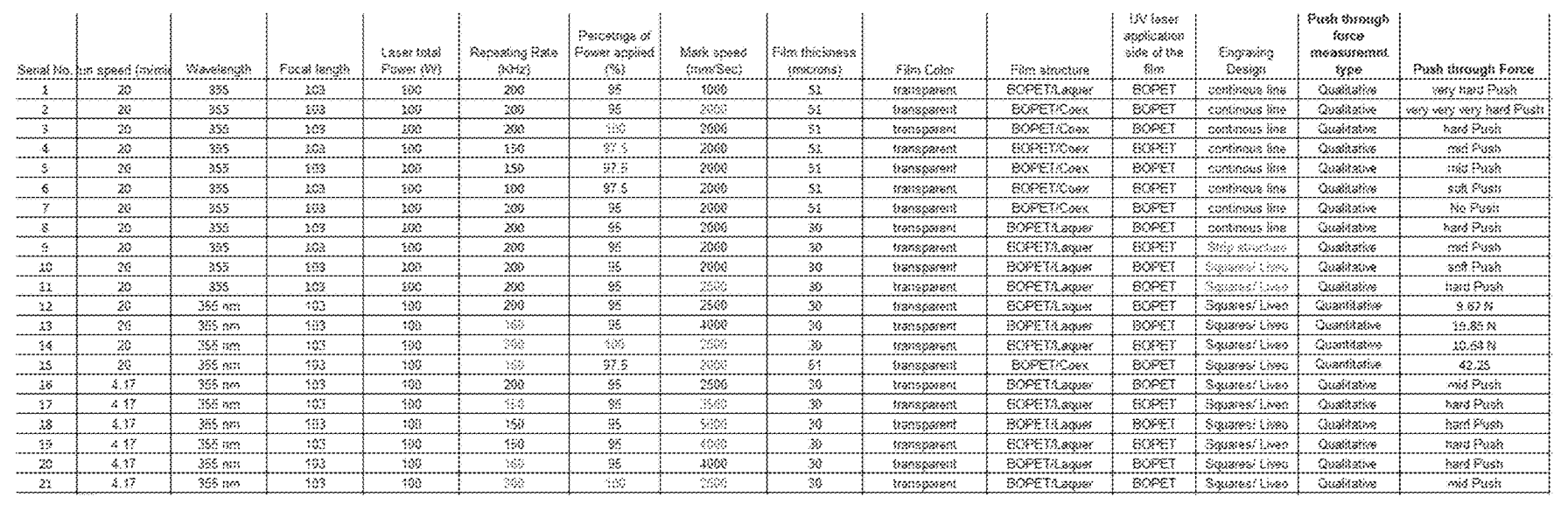

FIG. 8 shows the measured push through—finger pressure, and push through force (N) for each UV laser etched or engraved substrates or lidding films. FIG. 8 details objectives of the experimentation, foil run speed, UV laser property, UV laser application parameters, details of the lid foil used, lasering/engraving pattern. By varying the parameters, highly "controlled" scoring has been achieved by a UV laser application. A set of parameters have been found that are capable of push through—finger pressure (e.g., mid push or hard push). Similarly, a set of parameters have been found for push through force (N) and water vapor transmission rate (WVTR). Also, as shown in Trial Nos. 2 and 3, by increasing current and thus deepening cutting lines, push through—finger pressure changes from extremely hard to hard. Another example is, as shown in Trial Nos. 3, 4 and 6, by reducing repeating rate and thus applying more energy, push through—finger pressure changes from hard push to mid push to soft push. Another example is, as shown in Trial Nos. 7 and 8, by reducing the lid thickness from 51 microns to 30 microns, push through—finger pressure changes from no push to hard push. Another example is, as shown in Trial Nos. 8, 9 and 10, by changing the engraving structure from continuous line to strip structure to squares, push through—finger pressure changes from hard push to mid push to soft push.

Known prior methods have used a UV laser to print information on certain polymers because the UV laser is effective with respect to that polymer. The UV laser also produces a black mark on those polymers and thus provides an effective printing technique. In embodiments of the present disclosure, there are advantages to applying the UV laser to other types of polymers because the laser can be less effective (in relation to the other types of polymers) and therefore, provide an opportunity to provide a desired controlled UV laser produced etch or engraving adapted to rupture the plastic lid in select locations on the lid (in accordance with a "rupture" pattern created on the lid). Such polymers are described herein.

A UV laser may create a different physical interaction with the film as a function of the film material or the characteristics of the UV laser relative to other types of lasers.

Water vapor transmission rate (WVTR) test have been conducted to determine the barrier performance of the lid. This can determine whether the medicine is appropriately isolated in the closed blister. Testing conducted as per ASTM 1249 method using MOCON permetran equipment on the samples labeled "S" (PET Film with UV laser 80 kHz exposure—Parallelogram pattern) and "T" (PET Film with UV laser 80 kHz exposure—Rectangular Pattern) in FIGS. 6 and 7 provided the following corresponding water vapor transmission rate: 3.2043 g/($m^2$·day) and 3.6689 g/($m^2$·day). The testing condition is as follows: Temperature 38.0° C.; Test Gas RH: 90.0% RH; Mass Flow; Barometer: about 758 mmHg; Thickness: 27.00 μm; Test Mode: Continuous; Sample Area: 0.005 $m^2$. With the same testing condition, PET lidding foil with a parallelogram pattern (W) results in 3.5361 g/($m^2$·day); and PET lidding foil with a rectangular pattern (X) results in 3.4434 g/($m^2$ day). Standard PET lidding foil without any pattern results in 3.55 g/($m^2$·day). This suggests that there would be no significant sacrifice in terms of barrier performance (e.g., water vapor transmission) when making the patterns on the foil or lid.

In the lid film engraved by a UV laser, a width of etching or engraving can be controlled by UV laser application parameters. For example, by increasing a spot size, a larger width can be achieved. Similarly, In the lid film engraved by a UV laser, a depth of etching or engraving can be controlled by UV laser application parameters. For example, by increasing power, a larger depth can be achieved. The relationship between a width/depth and push through force (N)/water vapor transmission rate (WVTR) makes it possible to find the most suitable and desirable blister packs. A UV laser device can be provided and can have a work surface that can receive objects that will be the subject of the operation of the UV laser.

A computer is provided or included with the laser device that configures the operation of the laser device in accordance with parameters such as those described herein. The work surface and/or UV laser can be controlled by the computer to automatically produce the etching/engraving on the surface, as illustratively described herein. The operation would be stored into non-transitory computer readable medium of the computer. The medium would store computer executable instructions that when executed by the computer would perform the desired operation such as creating a check pattern on the lid.

While the specific embodiments of the present disclosure have been illustrated and described, it will be obvious to those skilled in the art that the present disclosure may be variously modified and changed without departing from the technical spirit of the present disclosure defined in the appended claims.

It should be understood that variations, clarifications, or modifications are contemplated. Applications of the technology to other fields not mentioned are also contemplated.

Exemplary methods and compositions are described. Since numerous modifications and changes will readily be apparent to those having ordinary skill in the art, it is not desired to limit the disclosure to only the exact constructions as demonstrated in this disclosure. Accordingly, all suitable modifications and equivalents may be resorted to falling within the scope of the disclosure.

Thus, for example, any sequence(s) and/or temporal order of steps of various processes or methods that are described herein are illustrative and should not be interpreted as being restrictive except as it would be generally understood from the context and description. Accordingly, it should be understood that although steps of various processes or methods or connections or sequence of operations may be shown and described as being in a sequence or temporal order, but they are not necessarily limited to being carried out in any particular sequence or order. For example, the steps in such processes or methods generally may be carried out in various different sequences and orders, while still falling within the scope of the present disclosure.

It should be understood that claims that include fewer limitations, broader claims, such as claims without requiring a certain feature or process step in the appended claim or in the specification, clarifications to the claim elements, different combinations, and alternative implementations based on the specification, or different uses, are also contemplated by the embodiments of the present disclosure.

It should be understood that combinations of described features or steps are contemplated even if they are not described directly together or not in the same context.

The terms or words that are used herein are directed to those of ordinary skill in the art in this field of technology and the meaning of those terms or words will be understood from terminology used in that field or can be reasonably interpreted based on the plain English meaning of the words in conjunction with knowledge in this field of technology. This includes an understanding of implicit features that for example may involve multiple possibilities, but to a person of ordinary skill in the art a reasonable or primary understanding or meaning is understood.

Embodiments of the present disclosure can include methods and/or compositions.

The terms "may" or "can" (or similar terms) are sometimes used herein to communicate that embodiments of the disclosure include the described features, attributes, or characteristics but are not necessarily limited to that feature, attribute, or characteristic. This is not to say that the use of "is" or "are" (or similar terms) are used to communicate that embodiments of the present disclosure are limited to that described feature, attribute, or characteristic.

It should be understood that the above description of the disclosure and specific examples, while indicating preferred embodiments of the present disclosure, are given by way of illustration and not limitation. Many changes and modifications within the scope of the present disclosure may be made without departing from the spirit thereof, and the present disclosure includes all such changes and modifications.

What is claimed is:

1. A blister package comprising:
a rupturable substrate; and
a blister layer overlayed by the substrate, thereby making a cavity between the rupturable substate and the blister layer,
wherein the rupturable substrate at least partially forms a UV laser produced engraving or etching that reduces push through force required for dispensing a product stored inside the cavity for customer dispensing, and
wherein the rupturable substate and the blister layer are made of the same or same class plastic, thereby making the blister package recyclable.

2. The blister package of claim 1, wherein a percentage difference between a water-vapor-transmission-rate (WVTR) of the rupturable substrate prior to the engraving or etching and a WVTR of the rupturable substrate after the engraving or etching is less than about 3%.

3. The blister package of claim 1, wherein the rupturable substrate and the blister layer are made of PET, APET, BOPET, RPET, PETG, PVC, polyolefin, or a mixture thereof.

4. The blister package of claim 3, wherein the rupturable substrate and the blister layer are made of APET, BOPET, RPET, PETG, HDPE, LDPE, BOPP, or a mixture thereof.

5. The blister package of claim 1, wherein the engraving/etching forms a pattern.

6. The blister package of claim 5, wherein the pattern is a check pattern.

7. The blister package of claim 6, wherein the check pattern is a rectangular or parallelogram check pattern.

8. The blister package of claim 1, wherein the engraving/etching is circular.

9. The blister package of claim 1, wherein the engraving/etching is formed on a portion of the rupturable substrate configured to be ruptured while dispensing the product.

10. The blister package of claim 1, wherein the rupturable substate and the blister layer are made of the same plastic.

11. The blister package of claim 1, wherein the engraving/etching comprises a plurality of non-intersecting line segments arranged to outline an array of polygonal micro-cells.

12. The blister package of claim 11, wherein the line segments of adjacent cells are spaced apart at their termini so that each cell is bounded by four discrete line segments.

13. The blister package of claim 1, wherein the rupturable substrate and/or blister layer comprises more than one layer.

14. The blister package of claim 1, wherein the rupturable substrate and the blister layer are in direct contact with each other.

15. The blister package of claim 1, wherein the rupturable substate or the blister layer is visibly clear.

16. The blister package of claim 1, wherein the rupturable substrate or the blister layer is translucent, colored, or opaque.

17. The blister package of claim 1, wherein the blister package is child resistant and senior friendly.

18. A blister package comprising:
a substrate; and
a rupturable blister layer overlayed by the substrate, thereby making a cavity between the substate and the rupturable blister layer,
wherein the rupturable blister layer at least partially forms a UV laser produced engraving or etching that reduces push through force required for dispensing a product stored inside the cavity for customer dispensing, and
wherein the substate and the rupturable blister layer are made of the same or same class plastic, thereby making the blister package recyclable.

19. A method of making a blister package:
sealing a substrate over a blister layer, thereby making a cavity between the rupturable substate and the blister layer, and
forming, by a UV laser, an engraving or etching on a portion of the substrate,
wherein the rupturable substate and the blister layer are made of the same or same class plastic, thereby making the blister package recyclable and wherein the engraving or etching adapts the substrate to be rupturable at or about the portion of the substrate.

20. The method of claim 19, wherein the blister package consists of one single material.

* * * * *